Patented Oct. 25, 1949

2,485,774

UNITED STATES PATENT OFFICE 2,485,774

PURIFICATION OF RECOVERED CAMPHOR

Adah Burkhead Richmond, North Arlington, N. J., assignor to E. I. du Pont de Nemours & Company, Wilmington, Del., a corporation of Delaware No Drawing. Application September 29, 1948, Serial No. 51,849

10 Claims. (Cl. 260—589)

This invention relates to the purification of recovered camphor and, more particularly, to such a purification whereby camphor adapted for use in the manufacture of clear or light colored cellulose nitrate plastics may be obtained.

Camphor is widely used as a plasticizer in cellulose nitrate plastics and it has long been the practice to recover camphor from scrap plastic by dissolving the plastic in an alkaline reagent such as an aqueous solution of caustic soda and then distilling off the camphor. By the term "recovered camphor" as used herein is meant camphor recovered from cellulose nitrate plastic by dissolving the plastic in an alkaline reagent and distillation of the camphor from the resulting solution. A typical process for the recovery of camphor from cellulose nitrate plastics is described in Horton U. S. Patent 1,350,157. While many variations of this process described by Horton are known in the art and the impurities in the recovered camphor are not readily identified, nevertheless the recovered camphor is quite uniform as to the general nature of the impurities contained therein although varying considerably in the intensity of discoloration, regardless of the specific cellulose nitrate plastics from which it is recovered, or variations in the method of recovery used.

Recovered camphor contains colored and haze-causing impurities in addition to other impurities of unknown constitution which are capable of forming colored and haze-causing compounds when the recovered camphor is aged or exposed to heat and/or light. Although methods have been described heretofore for purification of such camphor, these have been successful only in removing the colored and haze-causing impurities initially present, and not in removing or altering the impurities which are known to form colored and haze-causing compounds upon aging or exposure of the so purified camphor to heat and/or light.

Heretofore, recovered camphor and recovered camphor purified by prior art methods, have been used in cellulose nitrate compositions but only in the manufacture of black and dark colored plastics. Any attempt to use such camphor in clear and light or delicately colored cellulose nitrate plastic compositions has met with failure because of the impurities in the recovered camphor.

An object of the present invention is to provide an improved process of purifying recovered camphor to remove colored and haze-causing impurities therefrom or to alter such impurities to substantially colorless compounds that do not cause haze. A further object is to provide such a process whereby there may be removed from the recovered camphor other impurities that will form colored and haze-causing compounds upon aging or exposure to heat and/or light, so that the purified recovered camphor will exhibit no more than negligible increase in colored and haze-causing impurities upon aging and exposure to light. A more specific object is to provide a purification process that will give a recovered camphor adapted for use in the manufacture of cellulose nitrate plastic compositions of clear and light color. Other objects will become apparent from the description of the invention given hereinafter.

The above objects are accomplished according to the present invention by dissolving the recovered camphor in a saturated monohydric aliphatic alcohol having from 1 to 5 carbon atoms, inclusive, mixing with the resulting solution from 0.3% to 10% of hydrogen peroxide, by weight of the camphor, then mixing with said solution from 0.8% to 14% of activated carbon of particle size no greater than 44 microns, by weight of the camphor, maintaining contact between the activated carbon and the solution for at least five minutes, and thereafter filtering the solution to remove solids therefrom. The alcohol solution of purified recovered camphor may then be used directly in the manufacture of cellulose nitrate plastics or the camphor may be separated from the alcohol by conventional means and obtained as a solid.

Preferably, the invention is carried out by using ethyl alcohol as the camphor solvent since ethyl alcohol is the most commonly used alcohol in compounding formulations of cellulose nitrate plastics, and the camphor solution is mixed with 0.3% to 5% of hydrogen peroxide, and the activated carbon is of particle size of 1 to 20 microns. Further, it is preferred, as a practical procedure to remove the solids from the camphor solution by filtering the solution directly into an activated carbon bed and drawing the purified alcohol camphor solution from this bed, the time required for the solution to pass through the activated carbon bed being counted in determining whether the camphor solution has been in contact with the activated carbon for the stated period of at least five minutes.

filtration and after exposure to an S-1 sunlamp for 16 hours. For convenience of comparison, data on the untreated solution and from the run above have been included in this table.

*Table I*

| Camphor Solution | Ethyl Alcohol, parts | Camphor, parts | $H_2O_2$,* percent | Carbon,* percent | Initial color | Exposed color |
|---|---|---|---|---|---|---|
| untreated | 58 | 42 | | | 200-hazy | |
| treated | 58 | 42 | 4.2 | 7.0 | 7-clear | 7-clear. |
| Do | 58 | 42 | 8.4 | 12.0 | ---do | 5-clear. |
| Do | 58 | 42 | 2.1 | 3.5 | ---do | 10-clear. |
| Do | 58 | 42 | 4.2 | 6.0 | 10-clear | Do. |

¹ By weight of camphor in the portion.

The following examples in which all parts are by weight unless otherwise indicated, illustrate specific embodiments of the invention.

EXAMPLE I

A solution was prepared by dissolving 42 parts of camphor recovered from cellulose nitrate plastic in 58 parts of ethyl alcohol at a temperature from 100° F. to 150° F. A sample of this solution was slightly hazy and found to have a color of 180 APHA when compared to platinum-cobalt color standards by the procedure outlined in "Standard Methods for the Examination of Water and Sewage," 9th edition (1946), pages 14-15, a publication of the American Public Health Association.

To this solution with thorough mixing, there was added 0.3% of hydrogen peroxide, by weight of the camphor, in 35% aqueous solution. There was then added 0.9% activated carbon, by weight of the camphor, this activated carbon being of particle size from 1.6 to 14.4 microns, and the mixture was agitated for approximately 25 minutes. Solids were removed by filtration of the solution through an activated carbon bed.

After the purification treatment the alcohol-camphor solution was found to be clear and to have a color of 0 APHA. A portion of the solution was exposed for 16 hours to a mercury vapor sunlamp designated S1 and described in ASTM test D-795. The clarity was not changed and the color of the exposed solution was found to be 15 APHA, a negligible increase in color over the unexposed sample.

EXAMPLE II

A stock solution was prepared by dissolving 42 parts of camphor recovered from cellulose nitrate plastic in 58 parts of ethyl alcohol at 100° F. This solution was found to have a color of 200 APHA, and was hazy. A portion of this stock solution at a temperature of 100° F. was thoroughly mixed with 4.2% of hydrogen peroxide, by weight of the camphor in the portion, in 35% aqueous solution. There was then added with agitation 7% activated carbon, by weight of the camphor in the portion, this activated carbon being of particle size of less than 44 microns. The mixture was allowed to stand for 15 minutes and solids were then filtered from the solution by conventional means. The treated solution was found to have a color of 7 APHA. A portion of the treated solution exposed to an S-1 sunlamp for 16 hours was found to have a color of 7 APHA. Both portions were clear.

Following the procedure just described, other runs were conducted in which quantities of ingredients were used as listed in the following table. This table also includes the APHA color number of the treated solution directly after

EXAMPLE III

A stock solution was prepared by dissolving 42 parts of camphor recovered from cellulose nitrate plastic in 58 parts of isopropyl alcohol (containing 12.3% water) at 180° F. This solution was found to have a color of 50 APHA, and was hazy. A portion of this stock solution at a temperature of 180° F. was thoroughly mixed with 0.5% of hydrogen peroxide, by weight of camphor in the portion, in 35% aqueous solution. There was then added with agitation 2.7 percent of activated carbon by weight of camphor in the portion, this activated carbon being of particle size less than 44 microns. The mixture was allowed to stand for 5 minutes. Solids were then filtered from the solution by conventional means. The treated solution was found to have a color of 10 APHA. A portion of the treated solution exposed to an S-1 sunlamp for 16 hours was found to have a color of 10 APHA. Both portions were clear.

EXAMPLE IV

A stock solution was prepared by dissolving 42 parts of camphor recovered from cellulose nitrate plastic in 58 parts of methyl alcohol at 145° F. This solution was found to have a color of 40 APHA and was hazy. A portion of this stock solution at a temperature of 145° F. was thoroughly mixed with 0.5% of hydrogen peroxide, by weight of camphor in the portion, in 35% aqueous solution. There was then added with agitation 2.7% of activated carbon by weight of camphor in the portion, this activated carbon being of particle size of less than 44 microns. The mixture was allowed to stand for 5 minutes. Solids were then filtered from the solution by conventional means. The treated solution was found to have a color of 10 APHA. A portion of the treated solution exposed to an S-1 sunlamp for 16 hours was found to have a color of 10 APHA. Both portions were clear.

EXAMPLE V

A stock solution was prepared by dissolving 10 parts of camphor recovered from cellulose nitrate plastic in 90 parts of ethyl alcohol. The solution was filtered and the APHA color number determined. A portion of the filtered solution was exposed to an S-1 sunlamp for 16 hours, and the APHA color number again determined.

A second portion of the sample was thoroughly mixed with 1.75% of hydrogen peroxide, by weight of camphor in the portion, in 35% aqueous solution. There was then added 5% of activated carbon by weight of camphor in the portion, this activated carbon being of particle size of less than 44 microns. The mixture was agitated for 5 minutes and the solids filtered from the mixture by conventional means. The APHA color number was determined for this solution of purified camphor directly after filtration, and after exposure to an S-1 sunlamp for 16 hours.

This was repeated with a second lot of recovered camphor, and the results obtained in each instance are set forth in the following Table II:

*Table II*

| Camphor Lot No. | Untreated Solutions | | Treated Solutions | |
|---|---|---|---|---|
| | Initial Color | Exposed Color | Initial Color | Exposed Color |
| A | 15—clear | 50—hazy | 0—clear | 15—clear. |
| B | do | 70—hazy | do | 18—clear. |

It may be seen that the initial color of the untreated solution is low; this value is acceptable for use of the alcohol-camphor solution in clear and light or delicately colored cellulose nitrate plastic compositions. However, it will be noted that upon exposure the color increases to a high value and that haze appears. On the other hand, the treated solution initial color is 0 APHA and even after exposure is within the range of acceptability, and no haze appears. Therefore, even though the initial color of the untreated solution is sufficiently low and the solution is clear so as to permit its being used in the manufacture of clear and light or delicately colored cellulose nitrate plastics, the increase in coloration and haze of this untreated solution upon exposure would preclude its use in the manufacture of such plastics.

It will be understood that the above examples are merely illustrative and that the invention broadly comprises mixing the alcohol solution of recovered camphor with from 0.3% to 10% of hydrogen peroxide, then mixing said solution with from 0.8% to 14% of activated carbon of particle size no greater than 44 microns, maintaining contact between the activated carbon and the solution for at least five minutes, and thereafter filtering the solution to remove solids therefrom.

The first step of the process consists in dissolving the recovered camphor in alcohol. While any normally liquid alcohol capable of dissolving the camphor and having no deleterious action thereon, could be used, as a practical matter the alcohol will be selected from the saturated monohydric aliphtic alcohols having from 1 to 5 carbon atoms, inclusive. In addition to the alcohols used in the examples, this group includes propyl alcohol, butyl alcohol, isobutyl alcohol, amyl alcohol, and isoamyl alcohol, all of which may be used successfully. Small quantities of denaturants normally added to these alcohols, such as the benzene added to ethyl alcohol in formulating the commercial 2B alcohol, can be tolerated and have no effect on the purification reaction. Small quantities of water are not disadvantageous although, obviously, the water must not be present in sufficient proportion to prevent the camphor from going into solution or remaining in solution.

The proportion of alcohol to camphor is quite immaterial provided sufficient is used to dissolve the camphor. Likewise, the temperature employed is not critical as any temperature at which the alcohol is in the liquid state, is suitable. As a matter of speeding up the solution of the camphor in the alcohol, temperatures approaching the boiling point of the alcohol will be employed as shown by the examples but this is merely a matter of economy of time and has no bearing on the effectiveness of the purification.

A second step of the process comprises mixing hydrogen peroxide with the alcohol-camphor solution. While it is necessary that the camphor be completely dissolved in the alcohol to permit uniform action by the hydrogen peroxide on the impurities, as a practical matter the hydrogen peroxide may be added to the mixture of alcohol and camphor prior to complete solution of the camphor but, in this case, the activated carbon should not be added to the mixture until solution of the camphor is complete. It is preferred to agitate the alcohol-camphor solution containing hydrogen peroxide for at least one-half of a minute after solution is complete and before the activated carbon is added. Once the camphor solution and hydrogen peroxide are thoroughly mixed, the activated carbon may be added without further delay. If desired, the alcohol-camphor solution and hydrogen peroxide may be permitted to stand in contact for any length of time because, by limiting the quantity of hydrogen peroxide used, danger of undesirable side reaction is eliminated.

To assure a complete purification of the recovered camphor, at least 0.3% hydrogen peroxide, by weight of the camphor, should be used. It is not necessary to use more than 10% of hydrogen peroxide, by weight of the camphor, in practicing this invention and higher concentrations of hydrogen peroxide may cause undesirable side reactions; further, it is difficult to remove the excess hydrogen peroxide economically. It is preferred to use from 0.3% to 5% of hydrogen peroxide by weight of the camphor.

The hydrogen peroxide is most conveniently obtained and used as a 35% solution in water. Other concentrations may be employed but it is preferred to use aqueous solutions having at least 25% hydrogen peroxide to avoid excess amounts of water. Manifestly, there is no objection to using the highest concentration of hydrogen peroxide solution available. The addition of these small quantities of water that may be introduced with the recovered camphor, alcohol, or hydrogen peroxide does not have a detrimental effect upon the course of the purification reaction but there must not be so much water that the camphor would be precipitated from the alcohol solution.

The temperature at which the hydrogen peroxide is added to the camphor solution, is not critical and usually it will be approximately that at which solution of the camphor in alcohol took place since it is convenient to add the hydrogen peroxide without delay. In fact, so long as the temperature is maintained at a point where the alcohol used is in the liquid state, it is apparently immaterial what temperature is used except that somewhat elevated temperature does expedite solution of the camphor in the alcohol.

The hydrogen peroxide treatment alone is not sufficient to purify the camphor. The further step of mixing with an activated carbon of particle size less than 44 microns is required. Since the activated carbon acts to destroy all but small traces of residual hydrogen peroxide, it must not be added until solution of camphor is complete and mixture of the alcohol-camphor solution and hydrogen peroxide is homogeneous. The hydrogen peroxide-treated camphor solution should be in contact with the activated carbon for a minimum of at least five minutes. Under these conditions the amount of residual hydrogen peroxide in the alcohol-camphor solution will be negligible. For instance, following purification of recovered camphor by this invention, the residual hydrogen peroxide is not sufficient to alter the colors of any of the dyestuffs commonly used in coloring cellulose nitrate plastics. Furthermore, there is no undesired oxidation of cellulose nitrate by alcohol-camphor solutions purified according to this invention. On the other hand, if the time of contact of activated carbon with the hydrogen peroxide-containing alcohol-camphor solution is less than five minutes, it has been observed that there will be color changes in certain dyestuffs commonly used in cellulose nitrate plastics when they are added to the alcohol camphor solution so treated, and there may be a decrease in the stability of the cellulose nitrate plastic which has been manufactured using such alcohol-camphor solutions. The minimum of five minutes for time of contact between the hydrogen peroxide treated alcohol-camphor solution and activated carbon may in part be accomplished during filtration, a particularly effective method being to filter the solution directly into an activated carbon bed and to draw the purified alcohol camphor product from this bed. There is no upper limit on the time of contact between the activated carbon and the camphor solution.

Quantities of activated carbon less than 0.8% by weight of camphor are not sufficient to destroy residual hydrogen peroxide and to adsorb colored and haze-causing impurities and by-products of reaction between hydrogen peroxide and other compounds in the recovered camphor. Quantities of activated carbon in excess of 14% by weight of camphor are not necessary and are undesirable in that the mixtures are more difficult to filter and handle, and have been observed to leave a residual color different from that in the unpurified recovered camphor. The activated carbon should be in particles of size no greater than 44 microns for the successful destruction of unreacted hydrogen peroxide. While it might be possible to employ larger particles of activated carbon in greater quantity and satisfactorily destroy unreacted hydrogen peroxide, the increase in quantity of activated carbon required is so great that the mixture becomes impractical to agitate, filter, and handle. Therefore, the limitation to an activated carbon particle size of 44 microns should be observed. Activated carbon of particle sizes from 1 to 20 microns is preferred for use in this invention.

The purified camphor may be recovered from the alcohol-camphor solution by any conventional means. However, since a logical outlet for the purified camphor of this invention is in the manufacture of cellulose nitrate plastics, normally the purified camphor will not be recovered from the alcohol solution as such. Generally, the alcohol-camphor solution will be added as an ingredient to the cellulose nitrate composition mix prepared in manufacture of cellulose nitrate plastics.

By the method of this invention undesired colored and haze-causing impurities may be removed from recovered camphor and the product which results is no less pure than newly manufactured synthetic camphor. Furthermore, potential impurity-forming compounds are largely removed or altered to harmless materials for even under sunlamp exposure for long periods of time alcohol-camphor solutions treated by the method of this invention show only minor color increases. The camphor purified according to this invention may be used in the manufacture of cellulose nitrate plastics that are clear or of light or delicate color, a use heretofore not possible with recovered camphor. Cellulose nitrate plastics containing camphor which has been purified by the method of this invention will not change in color due to any action of the purified recovered camphor, as no harmful residues remain as the result of the purification process.

As many apparently widely different embodiments of this invention may be made without departing from the spirit and scope thereof, it is to be understood that the invention is not limited to the specific embodiments thereof except as defined in the appended claims.

I claim:

1. Process of purifying camphor recovered from cellulose nitrate plastics, which comprises dissolving said recovered camphor in a saturated monohydric aliphatic alcohol having from 1 to 5 carbon atoms, inclusive, mixing with the resulting solution from 0.3% to 10% of hydrogen peroxide, by weight of said camphor, then mixing with said solution from 0.8% to 14% of activated carbon of particle size no greater than 44 microns, by weight of said camphor, maintaining contact between said activated carbon and said solution for at least five minutes, and thereafter filtering said solution to remove solids therefrom.

2. Process as set forth in claim 1 wherein 0.3% to 5% of hydrogen peroxide, by weight of said camphor, is mixed with said solution of recovered camphor in said alcohol.

3. Process as set forth in claim 2 wherein said activated carbon is of particle size of 1 to 20 microns.

4. Process as set forth in claim 1 wherein said activated carbon is of particle size of 1 to 20 microns.

5. Process as set forth in claim 1 wherein said camphor solution mixed with said activated carbon is filtered through an activated carbon bed to remove solids from said solution.

6. Process of purifying camphor recovered from cellulose nitrate plastics, which comprises dissolving said recovered camphor in ethyl alcohol, mixing with the resulting solution from 0.3% to 10% of hydrogen peroxide, by weight of said camphor, then mixing with said solution from 0.8% to 14% of activated carbon of particle size no greater than 44 microns, by weight of said camphor, maintaining contact between said activated carbon and said solution for at least five minutes, and thereafter filtering said solution to remove solids therefrom.

7. Process as set forth in claim 6 wherein 0.3% to 5% of hydrogen peroxide, by weight of said camphor, is mixed with said solution of recovered camphor in ethyl alcohol.

8. Process as set forth in claim 7 wherein said carbon is of particle size of 1 to 20 microns.

9. Process as set forth in claim 6 wherein said activated carbon is of particle size of 1 to 20 microns.

10. Process as set forth in claim 6 wherein said camphor solution mixed with said activated carbon is filtered through an activated carbon bed to remove solids from said solution.

ADAH BURKHEAD RICHMOND.

No references cited.